US011902405B2

(12) United States Patent
Churei

(10) Patent No.: US 11,902,405 B2
(45) Date of Patent: Feb. 13, 2024

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Koji Churei, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/714,653

(22) Filed: Apr. 6, 2022

(65) Prior Publication Data

US 2022/0329674 A1    Oct. 13, 2022

(30) Foreign Application Priority Data

Apr. 9, 2021   (JP) .................................. 2021-066484

(51) Int. Cl.
*H04L 69/166*   (2022.01)
*H04L 69/00*    (2022.01)

(52) U.S. Cl.
CPC ............ *H04L 69/166* (2013.01); *H04L 69/03* (2013.01)

(58) Field of Classification Search
CPC .............................. H04L 69/166; H04L 69/03
See application file for complete search history.

(56) References Cited

U.S. PATENT DOCUMENTS

| | | | | |
|---|---|---|---|---|
| 7,457,316 B1* | 11/2008 | Durrant | ................... | H04L 69/26 370/473 |
| 10,567,284 B1* | 2/2020 | Piriyath | ................ | H04L 47/193 |
| 2004/0252721 A1* | 12/2004 | Lingafelt | ................ | H04L 45/00 370/473 |

FOREIGN PATENT DOCUMENTS

JP    2018196053 A    12/2018

* cited by examiner

*Primary Examiner* — Zhiren Qin
(74) *Attorney, Agent, or Firm* — Canon U.S.A., Inc. IP Division

(57) ABSTRACT

A communication apparatus for selecting a plurality of messages each including destination information indicating a common transmission destination from among a plurality of messages each including destination information indicating a transmission destination, a first generation unit configured to generate a plurality of transmission packets corresponding to the messages selected, in a batch, and a second generation unit configured to generate a transmission packet corresponding to a message not selected among the plurality of messages.

5 Claims, 7 Drawing Sheets

COMMUNICATION APPARATUS, COMMUNICATION METHOD, AND STORAGE MEDIUM

BACKGROUND OF THE DISCLOSURE

Field of the Disclosure

The present disclosure relates to a communication apparatus, a communication method, and a storage medium.

Description of the Related Art

Transmission processing of a communication apparatus is performed by a protocol stack in an operating system (OS) executed by a central processing unit (CPU) in the communication apparatus.

In the transmission processing performed by the protocol stack, protocol processing for transmission of data is performed on data designated in a transmission application interface by an application. The protocol processing including cutting the designated data into a specific size, generating a header including information such as destination information indicating a transmission destination, and adding the generated header to the cutout data generates a transmission packet. Further, repeating the cutout of data and the generation of a header produces all transmission packets for the designated data, and the generated transmission packets are transmitted to an apparatus of the transmission destination.

In recent years, to reduce the processing load of a CPU and/or to achieve high speed communication, a packet batch generation technique of generating header information for pre-segmented data is used, and performing data segmentation and generation of a plurality of headers in a later stage of protocol processing, when transmitting data to the same communication partner. Headers are reproduced for a plurality of packets based on the header information, which allows packet generation processing to be performed faster than that in generating a header for each packet (Japanese Patent Application Laid-Open No. 2018-196053).

Such a packet batch generation technique is generally called large send offload (LSO). In particular, this technique applied to a protocol based on Transmission Control Protocol (TCP) may also be called TCP segmentation offload (TSO).

As another technique of transmitting data more efficiently, there is an example in which a protocol stack provides a transmission application programming interface (API) for transmitting a plurality of pieces of transmission data at a time. A transmission request can be made to the protocol stack through one application interface operation for complicated transmission, such as transmission of different data for each communication partner, or transmission of identical data to a plurality of communication partners, through designation of a transmission destination for each data to be transmitted.

For example, in a protocol stack of a Linux® OS, sendmsg( ) is implemented as a transmission application interface for transmitting a plurality of messages at a time. Each of the messages includes data to be transmitted and transmission destination information thereof.

In the technique discussed in Japanese Patent Application Laid-Open No. 2018-196053, the processing performed by a protocol stack that has received a request to transmit a plurality of messages at a time involves changing the content of a header to be added to each packet, if a different transmission destination is included in the messages of which transmission is requested. That prevents batch generation of transmission packets.

SUMMARY OF THE DISCLOSURE

In view of the foregoing issue, the present disclosure is directed to appropriate batch generation of transmission packets even in transmission processing on a plurality of messages including a different transmission destination.

According to an aspect of the present disclosure, a communication apparatus includes at least one first processor and at least one first memory coupled to the first processor and having stored thereon instructions that, when executed by the first processor, cause the first processor and the first memory to cooperate to act as a selection unit configured to select a plurality of messages each including destination information indicating a common transmission destination from among a plurality of messages each including destination information indicating a transmission destination, a first generation unit configured to generate a plurality of transmission packets corresponding to the messages selected by the selection unit, in a batch, and a second generation unit configured to generate a transmission packet corresponding to a message not selected by the selection unit among the plurality of messages.

Further features of the present disclosure will become apparent from the following description of exemplary embodiments with reference to the attached drawings.

DESCRIPTION OF THE EMBODIMENTS

Some exemplary embodiments of the present disclosure will be described in detail below with reference to the attached drawings. The exemplary embodiments to be described below are examples of ways of implementing the present disclosure, and are to be modified or changed as appropriate based on the configuration of an apparatus to which the present disclosure is applied and various conditions, and the present disclosure is not limited to the following exemplary embodiments. In addition, not all of the features described in the exemplary embodiments are used for the solution of the present disclosure.

<Communication Apparatus Configuration>

Figure 1:
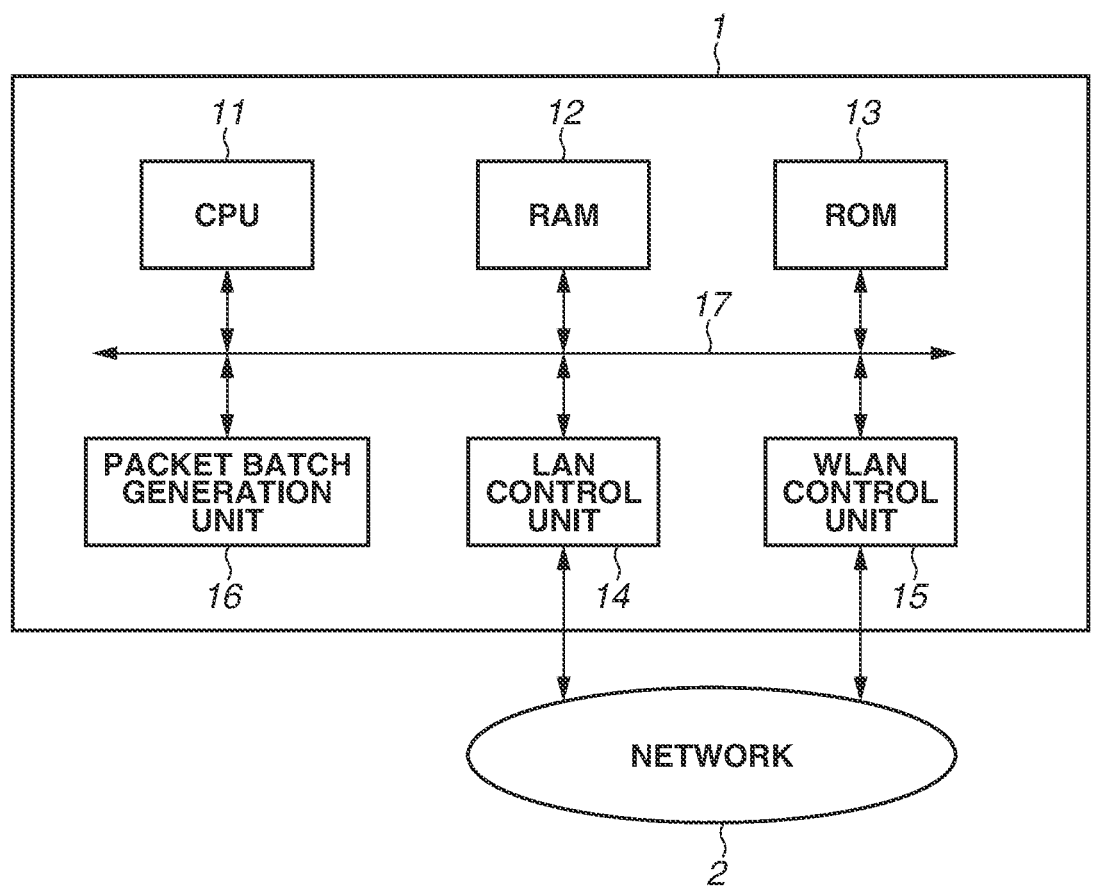
FIG. 1 is a block diagram illustrating a configuration example of a communication apparatus according to a first exemplary embodiment.

FIG. 1 is a block diagram illustrating a configuration example of a communication apparatus 1 according to a first exemplary embodiment.

The communication apparatus 1 includes a central processing unit (CPU) 11, a random access memory (RAM) 12, and a read only memory (ROM) 13. The communication apparatus 1 further includes a local area network (LAN) control unit 14 and a wireless local area network (WLAN) control unit 15 each performing communication via a network 2, and also includes a packet batch generation unit 16. The CPU 11, the RAM 12, the ROM 13, the LAN control unit 14, the WLAN control unit 15, and the packet batch generation unit 16 are connected one another by a bus 17.

The CPU 11 runs programs, and controls the general communication apparatus 1. The programs include an operating system (OS), protocol stack processing in the OS, and applications. The RAM 12 is used as a memory for storing and managing transmission/reception data. The RAM 12 is also used to store data for the CPU 11 to perform each type of processing. The ROM 13 stores various programs to be run by the CPU 11.

The LAN control unit 14 is a wire communication interface to connect to the network 2, and transmits and receives transmission packets. The LAN control unit 14 includes hardware circuitry of a physical (PHY) layer and a media access control (MAC) layer of a transmission medium. For example, if the interface of the LAN control unit 14 is an Ethernet® type, the LAN control unit 14 is an Ethernet network interface card (NIC).

The WLAN control unit 15 is a wireless communication interface to connect to the network 2, and transmits and receives transmission packets. The WLAN control unit 15 includes a controller that controls a wireless LAN compliant with the Institute of Electrical and Electronics Engineers (IEEE) 802.11a/b/g/n/ac or the like, and radio frequency (RF) circuitry.

The packet batch generation unit 16 can take a large packet, as described below, as input, divide the large packet into a plurality of packets, and output the packets. The packet batch generation unit 16 generates a plurality of headers by reproducing and modifying a communication protocol header in the large packet, and adding the headers to transmission data divided into a plurality of data, thereby generating the packets. Packet generation processing can be thereby performed faster than that in generating a header for each packet. The packet batch generation unit 16 is a block indicating a part of the protocol stack processing performed by the CPU 11, for convenience. The protocol stack processing includes implementing a function of performing normal packet generation, in addition to the packet batch generation unit 16.

<Configuration of Packet Management Structure>

Figure 2:
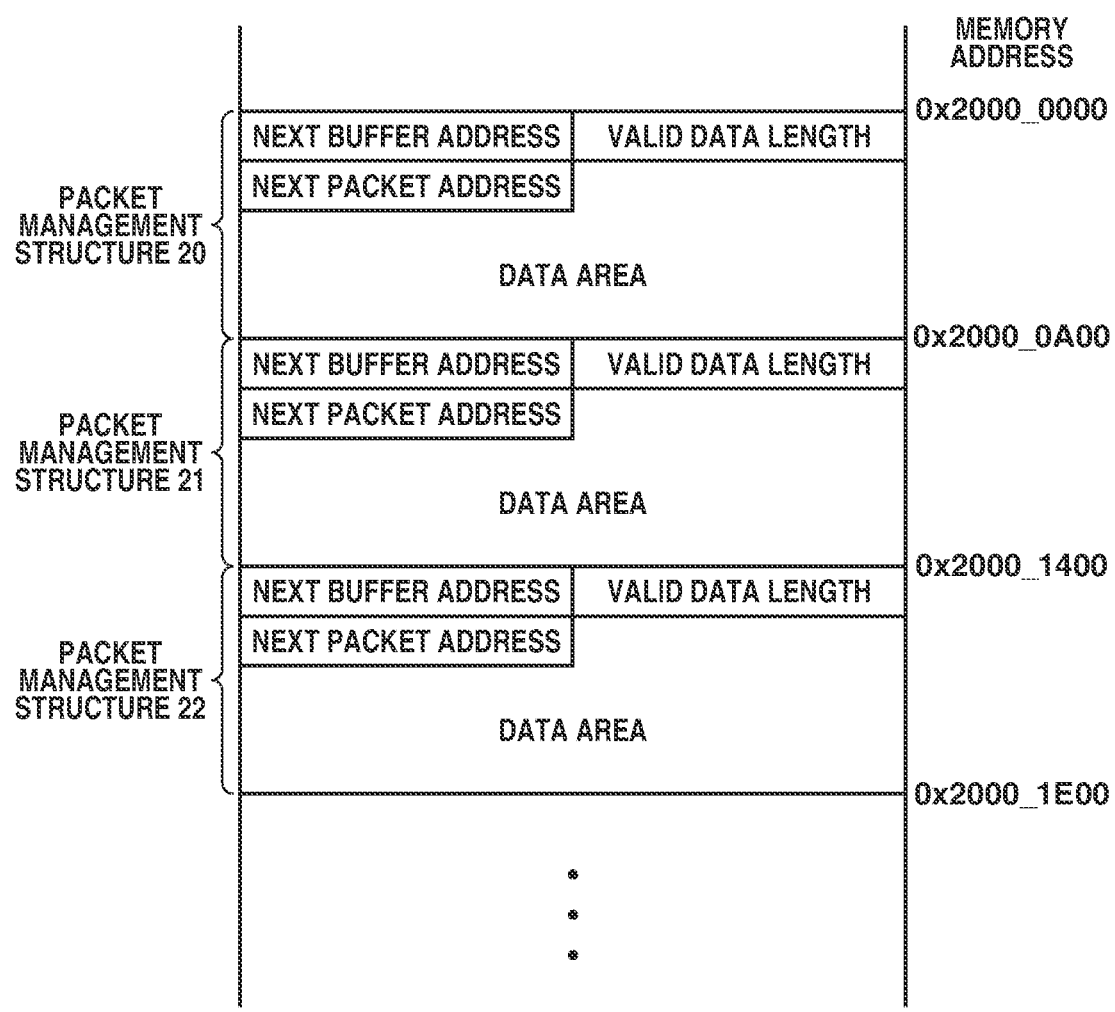
FIG. 2 is a diagram illustrating a configuration example of packet management structures.

FIG. 2 is a configuration example illustrating packet management structures 20, 21, and 22 used in packet transmission and reception processing in the protocol stack. In FIG. 2, each of the packet management structures 20, 21, and 22 is in a continuous area on the memory, but is not limited thereto.

The packet management structures 20 to 22 are stored in a predetermined area of the RAM 12 at the time of, for example, the activation of the CPU 11. An area for storing the packet management structures 20 to 22 is secured in the RAM 12 as appropriate in the transmission processing and reception processing performed by the CPU 11. The secured area is managed so that, in response to completion of the transmission processing and the like, at which the packet management structures 20 to 22 are no longer used, the secured area is released and brought into a state where the area can be secured again.

Each of the packet management structures 20 to 22 includes a next buffer address, a next packet address, a valid data length, and a data area, as members (contents).

Each of the members of the packet management structures 20 to 22 will be described.

All the information in each of the members except for the data area in the present exemplary embodiment is set by the CPU 11.

The next buffer address indicates address information about another packet management structure. For example, if a packet management structure to be connected to the packet management structure 20 is a packet management structure 22, "0x2000_1400", which is the leading memory address of the packet management structure 22, is stored in the next buffer address of the packet management structure 20. If data of a size not fitting into the data area of one packet management structure is to be stored, the data can be stored with packet management structures connected to each other. In such a case, the next buffer address is used.

The next packet address is used to indicate a boundary between packets. Information stored here is address information about another packet management structure, as with the next buffer address.

The valid data length indicates the length of data stored in the data area.

In the data area, data is stored. In the present exemplary embodiment, transmission data is stored as a payload of a packet. The CPU 11 copies transmission data designated by an application that has issued a transmission request, so that the payload is stored.

<Packet Transmission Processing>

Figure 3:
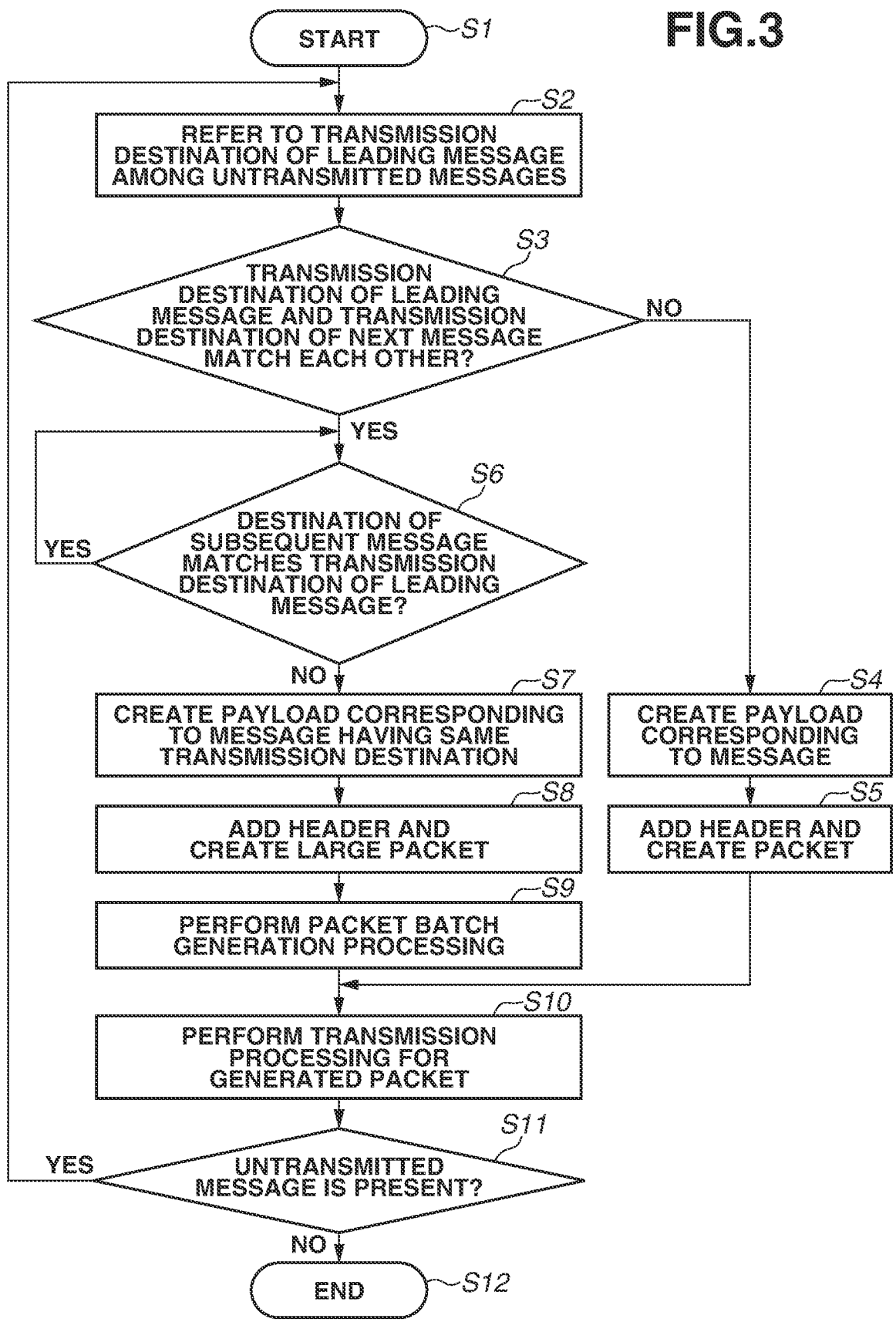
FIG. 3 is a flowchart illustrating an example of packet transmission processing performed by a protocol stack.

FIG. 3 is a flowchart illustrating an example of packet transmission processing performed by the protocol stack that operates on the CPU 11.

In step S1, in response to a call of an application interface for transmission by an application through a system call, the packet transmission processing through the protocol stack performed by the CPU 11 begins.

In the present exemplary embodiment, the protocol stack provides an application interface at which a plurality of messages can be designated by one transmission request. The application generates a plurality of messages each including a common transmission destination as appropriate and provides the generated messages to the protocol stack.

The messages each include a transmission destination and a storage address of transmission data.

As an example of information (destination information) indicating the transmission destination, there is an Internet Protocol (IP) address used in IP communication. As another example, there is a port number used in Transmission Control Protocol (TCP) communication or User Datagram Protocol (UDP) communication.

In step S2, the protocol stack refers to the transmission destination of the leading message among untransmitted messages. Initially, the protocol stack refers to the leading message among messages designated in the application interface.

In step S3, the protocol stack determines whether the transmission destination of the leading message and the transmission destination of the second message among the untransmitted messages match each other. In other words, the protocol stack determines whether a set of the IP address and the port number of the leading message and a set of those of the next message match each other. If those do not match each other (NO in step S3), the processing proceeds to step S4.

In step S4, the protocol stack starts processing of generating a packet corresponding to the leading message among the untransmitted messages. More specifically, the protocol stack acquires data about a packet management structure, and creates a payload by copying transmission data indicated by the leading message among the untransmitted messages. The transmission data is copied from an area used by the application in the RAM 12 to the data area of the packet management structure. In addition, the size of the copied data is set in the valid data length of the packet management structure.

In step S5, the protocol stack creates a header for the created payload to create a packet. In this process, the protocol stack acquires a new packet management structure, and creates a header in a data area. For example, the protocol stack creates an Ethernet® header, an IP header, and a UDP header. The protocol stack sets the next buffer address as a member of the packet management structure that stores the header indicating the packet management structure that stores the payload for the packet configuration.

Figure 4:
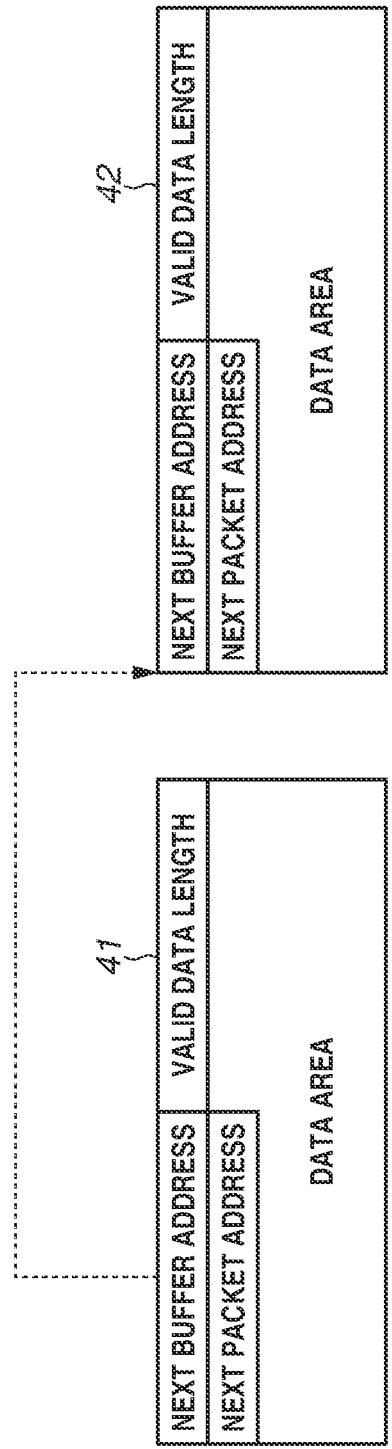
FIG. 4 is a diagram illustrating a configuration example of a packet with packet management structures.

FIG. 4 illustrates an example of the packet configuration with packet management structures.

In the example in FIG. 4, the header of a packet is stored in the data area of a packet management structure 41, and the payload is stored in the data area of a packet management structure 42. In addition, the address information about the packet management structure 42 is set in the next buffer address of the packet management structure 41.

In FIG. 3, if the set of the IP address and the port number of the leading message and the set of those of the next message match each other (the transmission destinations match each other) (YES in step S3), the processing proceeds to step S6.

In step S6, the protocol stack determines whether the destinations of the third and subsequent messages match the transmission destination of the leading message. If a message of which the transmission destination does not match the transmission destination of the leading message is found or if there are no subsequent messages (NO in step S6), the processing proceeds to step S7. That allows a consecutive plurality of messages each having destination information indicating the common transmission destination to be selected.

In step S7, the protocol stack creates a payload corresponding to each of the messages having the same designated transmission destination, which is determined in step S6. The method of creating the payload for one message is similar to that in step S4, and the payload is created with a packet management structure. In step S7, a plurality of payloads is created, and the links between the payloads are listed using the next packet address of the packet management structure.

In step S8, the protocol stack creates a header for the payloads created in step S7, and creates a packet. In a manner similar to step S5, the protocol stack acquires a packet management structure, and stores the header in the data area thereof. The set content of the header is similar to that in the case of creating the packet for the leading payload and transmitting the packet. The protocol stack sets the address information about the packet management structure in which the leading payload created in step S7 is stored, in the next buffer address of the packet management structure in which the header is stored, and configures the packet. This packet configuration with the payloads and the header will be referred to as a large packet.

Figure 5:
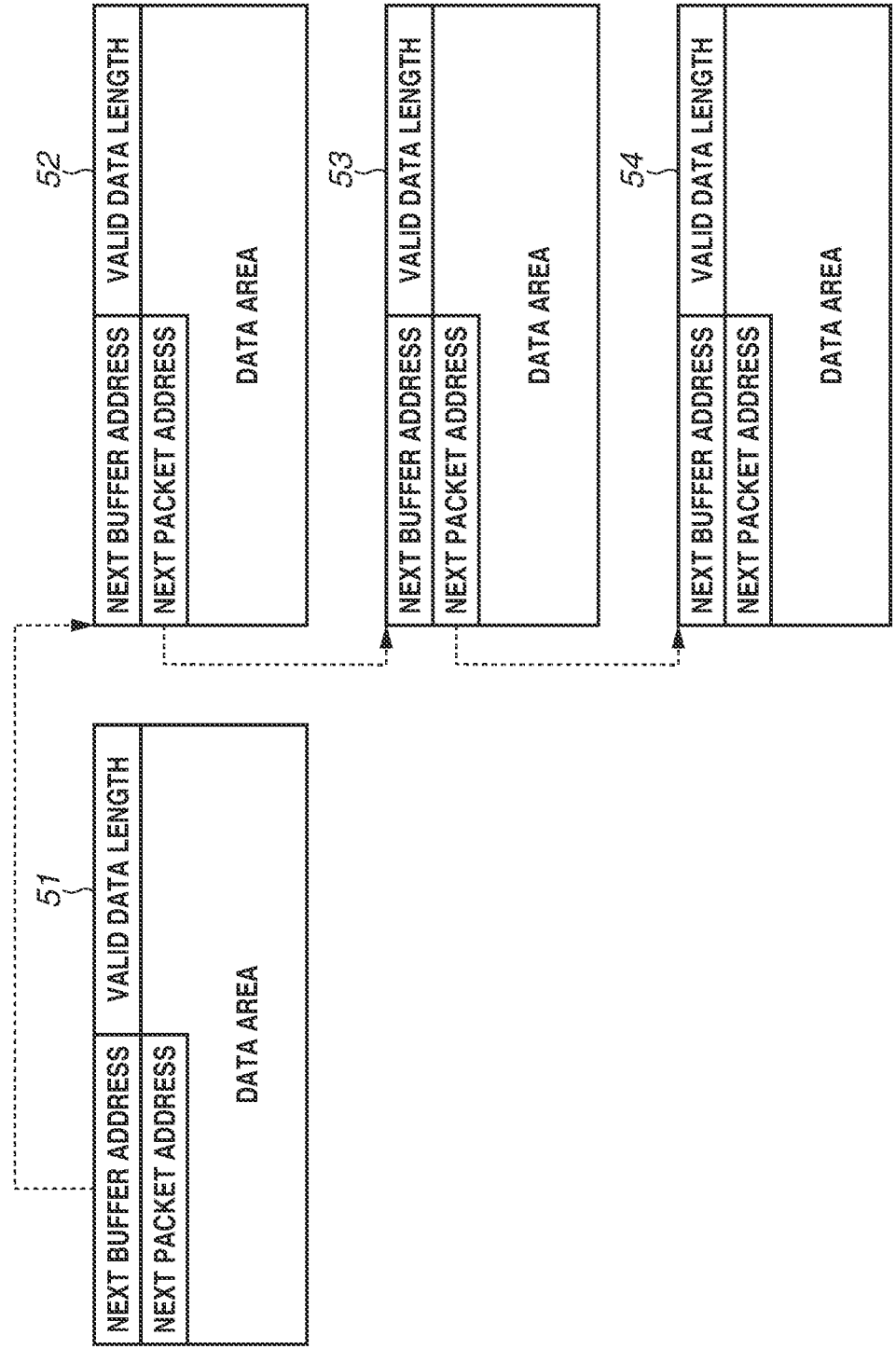
FIG. 5 is a diagram illustrating a configuration example of a large packet with packet management structures.

FIG. 5 illustrates an example of the large packet configuration with packet management structures.

In the example in FIG. 5, the header of the large packet is stored in the data area of a packet management structure 51, and a payload corresponding to each message is stored in the data area of the corresponding packet management structure of the packet management structures 52 to 54. The address information of the packet management structure 52 is set in the next buffer address of the packet management structure 51. Further, the address information about the packet management structure 53 is set in the next packet address of the packet management structure 52, and the address information about the packet management structure 54 is set in the next packet address of the packet management structure 53.

In FIG. 3, in step S9, the protocol stack divides the large packet into a plurality of packets in performing packet batch generation processing. The packet batch generation processing can be performed by the packet batch generation unit 16. In the packet batch generation processing, the header information included in the large packet is reproduced for each of the payloads, so that the number of headers the same as the number of payloads is generated.

For example, when the packet batch generation processing is performed for the large packet illustrated in FIG. 5, a new packet management structure for storing a header for the payload of the packet management structure 53 is secured, and the address information about the packet management structure 53 is set in the next buffer address. Similarly, a new packet management structure for storing a header for the payload of the packet management structure 54 is secured, and the address information about the packet management structure 54 is set in the next buffer address. For a header for the payload of the packet management structure 52, the header of the packet management structure 51 is utilized, which means that a new packet management structure is not secured.

Afterward, processing of reproducing the header is performed by the packet batch generation unit 16. The header stored in the packet management structure 51 is copied to the data area of the new packet management structure secured for each of the headers. Among the content of the copied header, the part to be changed for each of the packets is changed by the packet batch generation unit 16. For example, a check sum value to be used in TCP or UDP is to be calculated for each of the packets, and thus is calculated by the packet batch generation unit 16, and the calculation result thereof is written in the header. In this way, each of the packets is generated from the large packet.

In step S10, the protocol stack performs transmission processing for the generated packet. In this step, with a plurality of packets generated in step S9 described above, all the generated packets are transmitted.

In response to the completion of the transmission processing, in step S11, the protocol stack determines whether any untransmitted message is still present. If any untransmitted message is present (YES in step S11), the processing returns to step S2 to repeat the above-described steps. Otherwise (NO in step S11), the processing proceeds to step S12 in which the transmission processing by the protocol stack ends, and the processing by the application resumes.

As described above, in the present exemplary embodiment, the packet batch generation processing can be performed for the messages in which the same transmission destinations are designated in succession, and also in the batch transmission of a plurality of messages including different transmission destinations. In other words, in the present exemplary embodiment, the batch generation of transmission packets can be appropriately performed also in the transmission processing for a plurality of messages including different transmission destinations.

In addition, in the present exemplary embodiment, sequential messages each including destination information indicating a common transmission destination are selected from a plurality of messages, and a batch generation of transmission packets is performed, reducing the processing load. In the present exemplary embodiment, a batch generation of packets is performed without limiting the number of messages as long as the same transmission destinations continues, but a limit may be set depending on the resources in the protocol stack. For example, if the number of packet management structures to be acquired in creating payloads is less than a desirable number, the number of messages in creating a large packet may be limited.

A second exemplary embodiment will be described. In the above-described first exemplary embodiment, the packet batch generation processing is applied to the consecutive messages having the common transmission destination, but in the second exemplary embodiment, the packet batch generation processing is also applied to inconsecutive messages. In other words, in the present exemplary embodiment, messages each having destination information indicating a common transmission destination is selected by being extracted from a plurality of messages, and a plurality of transmission packets corresponding to the selected messages is generated in a batch. A communication apparatus 1 of the second exemplary embodiment is configured in a manner similar to that of the first exemplary embodiment illustrated in FIG. 1.

Figure 6:
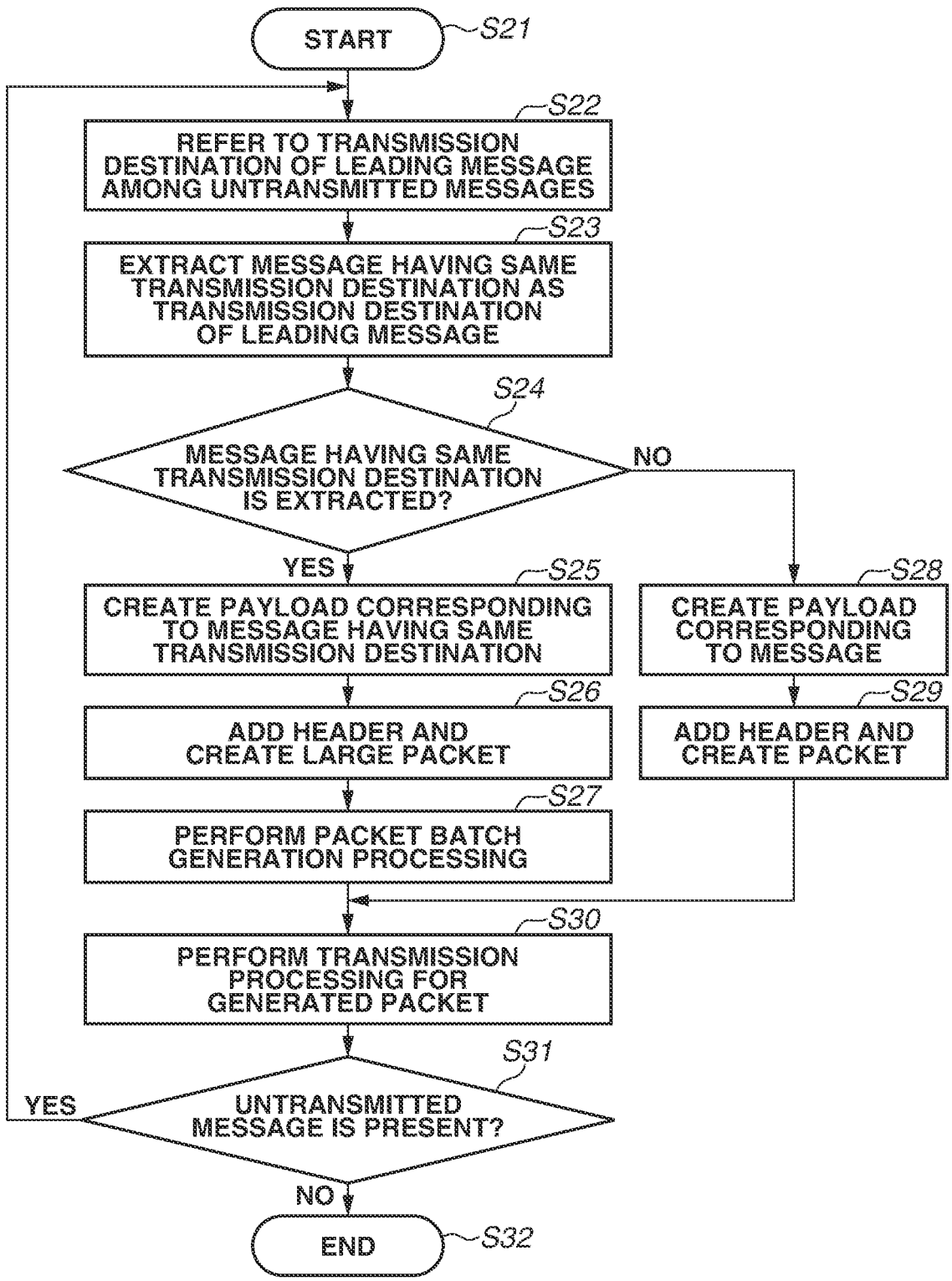
FIG. 6 is a flowchart illustrating an example of packet transmission processing according to a second exemplary embodiment.

FIG. 6 is a flowchart illustrating an example of packet transmission processing performed by a protocol stack in the present exemplary embodiment.

In step S21, in response to a call of an application interface for transmission by an application, the protocol stack starts transmission processing, and subsequently, in step S22, the protocol stack refers to the transmission destination of the leading message among untransmitted messages, as with the first exemplary embodiment.

In step S23, the protocol stack extracts a message in which the same transmission destination as the transmission destination of the message referred to in step S22 is designated, from the next and subsequent untransmitted messages.

In step S24, the protocol stack branches the processing based on the result of the extraction in step S23. If a message in which the same transmission destination as the transmission destination of the leading message is designated is extracted (YES in step S24), the processing proceeds to step S25.

In step S25, the protocol stack creates a payload for each of the leading message and the extracted message. In step S26 and step S27, a large packet is created, and packet generation is performed using a packet batch generation unit 16, as with step S8 and step S9 described above.

If a message in which the same transmission destination as the destination of the leading message is designated is not extracted in step S23 (NO in step S24), the processing proceeds to step S28.

In step S28, the protocol stack creates a payload for the leading message. Afterward, in step S29, the protocol stack creates one packet by adding a header for the created payload. The processing in step S28 and step S29 are similar to that in step S4 and step S5 described above.

In step S30, the protocol stack performs transmission processing for the created packet. With a plurality of packets generated in step S27, the protocol stack transmits all the created packets.

In response to the completion of the transmission processing, in step S31, the protocol stack determines whether any untransmitted message is still present. If any untransmitted message is present (YES in step S31), the processing returns to step S22 to repeat the above-described steps. Otherwise (NO in step S31), the processing proceeds to step S32 in which the transmission processing performed by the protocol stack ends, and the processing by the application resumes.

As described above, in the present exemplary embodiment, a message in which the same transmission destination is designated among a plurality of designated messages can be extracted, and the batch generation processing for all transmission packets can be performed for the extracted message.

In the present exemplary embodiment, a series of steps of processing for performing packet generation and transmission after message extraction is repeated, but the processing sequence may be changed. For example, the transmission packet generation processing may be performed for each of transmission destinations, after all messages are classified according to the set transmission destination upon start of the processing.

A third exemplary embodiment will be described. In the above-described first and second exemplary embodiments, a protocol stack collects messages having a common transmission destination and performs transmission processing. In the third exemplary embodiment, an application collects messages having a common transmission destination. In other words, in the present exemplary embodiment, the application generates a plurality of messages including a common transmission destination, and provides the generated messages to a protocol stack. A communication apparatus 1 of the third exemplary embodiment is configured in a manner similar to that of the first exemplary embodiment illustrated in FIG. 1.

Figure 7:
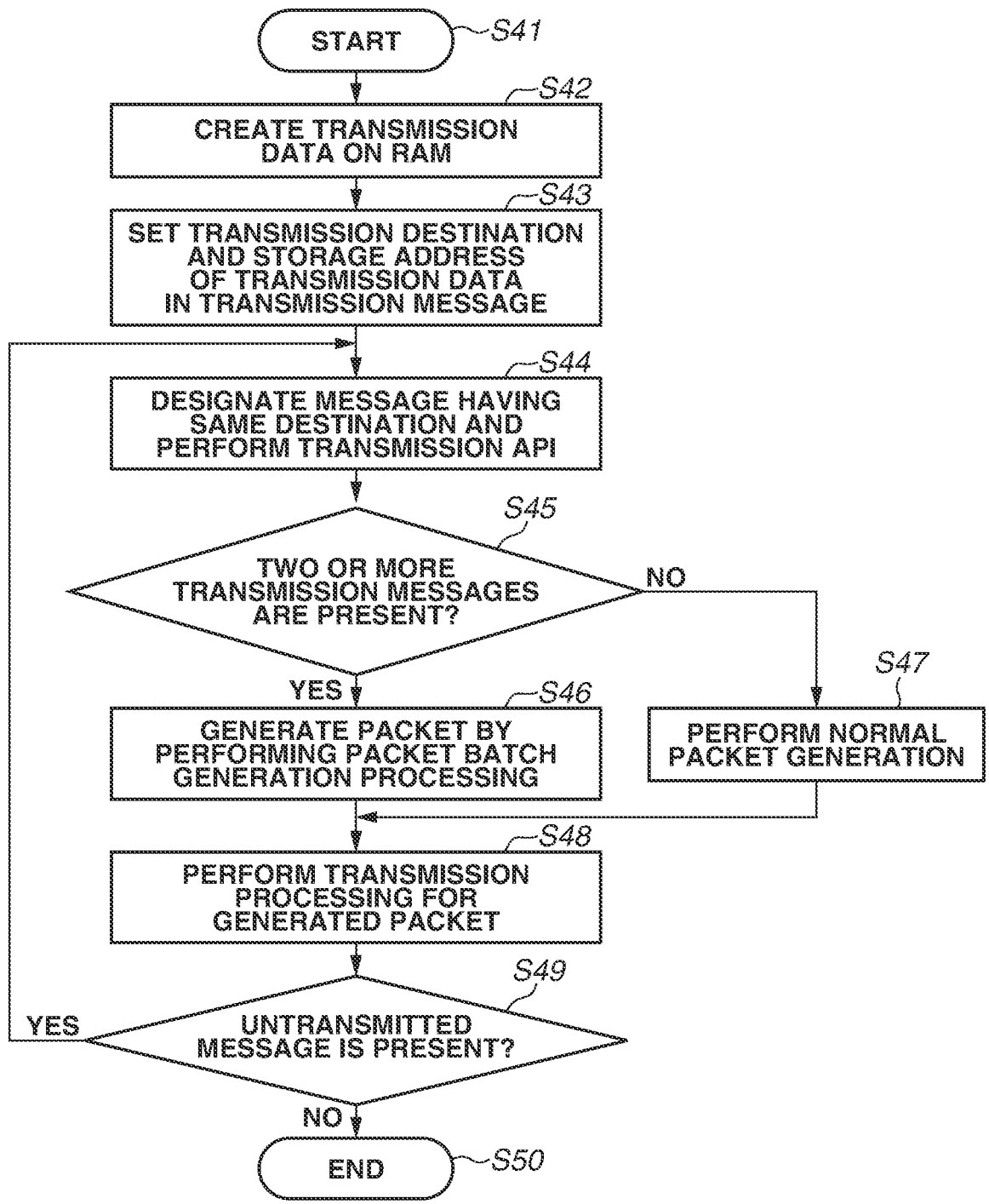
FIG. 7 is a flowchart illustrating an example of message transmission processing according to a third exemplary embodiment.

FIG. 7 is a flowchart illustrating an example of message transmission processing in the present exemplary embodiment.

In step S41, in response to the start of data transmission by the application operating on a CPU 11, the processing of this flowchart begins. The processing in step S42 to step S44 are performed by the application.

In step S42, the application creates transmission data. Afterward, the application stores the data to be transmitted to outside, in a RAM 12.

In step S43, the application creates messages to be transmitted. Each of the messages includes a destination and a storage address of transmission data, as with the other exemplary embodiments. The storage address of the data stored in the RAM 12 in step S42 is set in each of the messages, determining transmission data about each of the messages. Alternatively, setting a storage address of common transmission data in different messages allows creation of the messages with the common transmission data.

Setting the application the transmission destination in the message in which the transmission data is set completes the message.

In step S44, the application extracts a message in which the same destination is designated, from the created messages, and requests the protocol stack to perform transmission, via an application interface. If one message with the common transmission destination is present, the application can request transmission via an application interface for transmitting the one message.

The processing in step S45 to step S48 are performed by the protocol stack.

In step S45, the protocol stack determines whether two or more messages are designated in a transmission API. If two or more messages are designated in the transmission API (YES in step S45), the processing proceeds to step S46. If one message is designated (NO in step S45), the processing proceeds to step S47. In the present exemplary embodiment, the transmission destination of the message is not determined in the protocol stack.

In step S46, the protocol stack performs packet generation processing in packet batch generation processing. In step S47, the protocol stack performs normal packet generation processing. The other processes are similar to those of the first exemplary embodiment and the second exemplary embodiment described above, and thus the description thereof will be omitted.

In step S48, the protocol stack performs transmission processing for the generated packet. With a plurality of packets generated in step S47, the protocol stack transmits all the generated packets. Upon completion of the transmission processing, the processing performed by the protocol stack ends, and the processing performed by the application resumes.

In step S49, the application determines whether any untransmitted message is still present. If any untransmitted message is present (YES in step S49), the processing returns to step S44 to repeat the above-described steps. Otherwise (NO in step S11), the processing proceeds to step S50, in which the transmission processing performed by the application ends.

As described above, in the present exemplary embodiment, the application collects messages having the common transmission destination, and requests the transmission via an application interface. In the present exemplary embodiment, this allows the protocol stack to perform the transmission packet batch generation processing for the message of which the transmission is requested, without paying attention to the destination.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-066484, filed Apr. 9, 2021, which is hereby incorporated by reference herein in its entirety.

What is claimed is:

1. A communication apparatus comprising:
at least one memory that stores instructions; and
at least one processor that executes instructions, the instructions, when executed, causing the at least one processor to act as:
a generation control unit configured to perform generation processing of generating a large packet in a case where destinations of a target message and one or more subsequent messages constituting a set of a plurality of messages each including destination information generated by an application match, said large packet being comprised of the target message and the one or more subsequent messages, and generating a non-large transmission packet corresponding to the target message in a case where destinations of the target message and a subsequent message following immediately after the target message do not match; and
a batch generation unit configured to generate a plurality of transmission packets corresponding to the large packet generated by the generation control unit,
wherein, upon completion of generating the large packet or the non-large transmission packet, the generation control unit selects, as a new target message, a subsequent message following immediately after a message corresponding to the generated large packet or the generated non-large transmission packet and constituting the set of plurality of messages each including destination information, and performs generation processing of generating a next large packet or a next non-large transmission packet.

2. The communication apparatus according to claim 1, wherein the destination information included in each of the plurality of messages includes an Internet Protocol (IP) address and a port number.

3. The communication apparatus according to claim 2, wherein the generation control unit starts the generating process, in response to receiving a transmission instruction of the set of a plurality of messages from the application.

4. The communication apparatus according to claim 3, wherein the application triggers the transmission instruction by calling a system calling function.

5. The communication apparatus according to claim 3, wherein the system calling function is sendmmsg function.

* * * * *